Jan. 3, 1967   D. A. GIRARD   3,295,805
SUPPORT STRUCTURE AND CONNECTION BETWEEN
A STRUCTURE AND A FIXTURE

Filed March 16, 1966   3 Sheets-Sheet 1

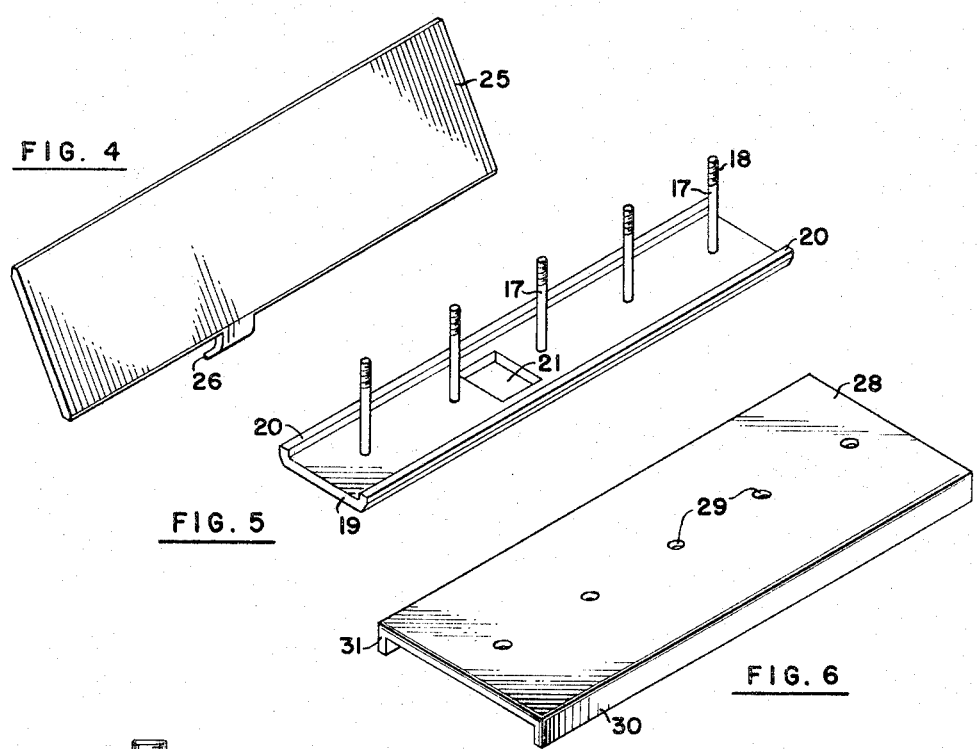
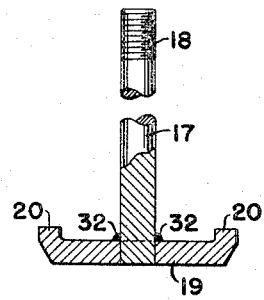
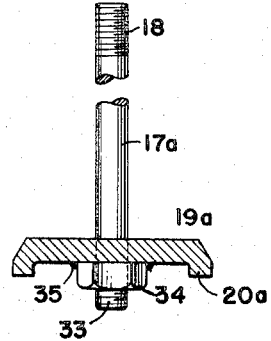
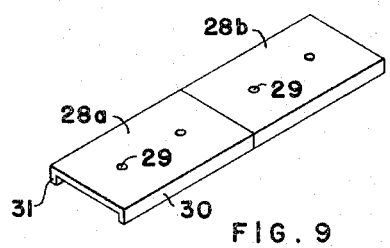
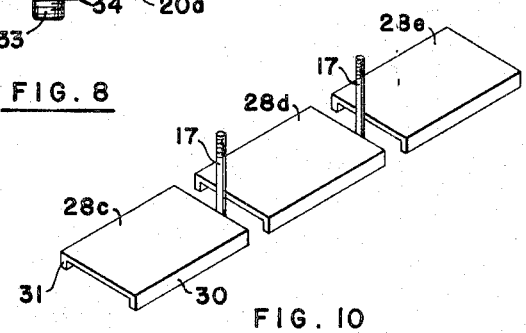

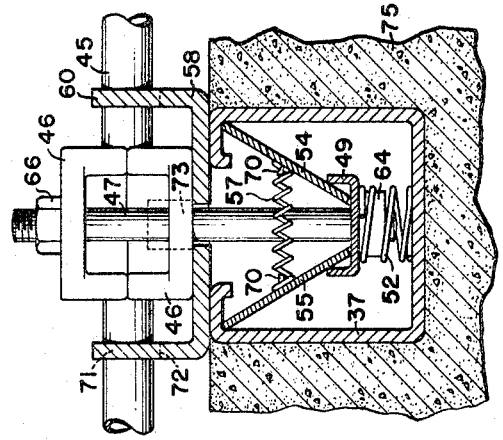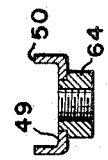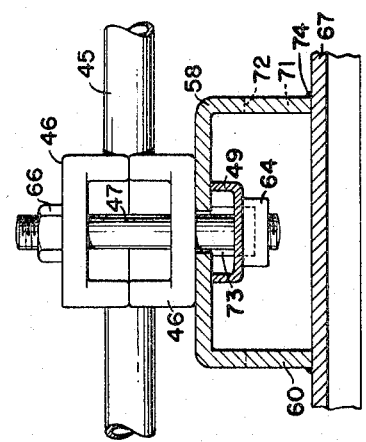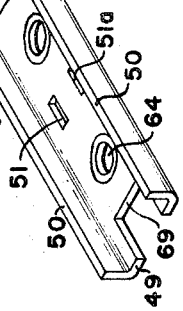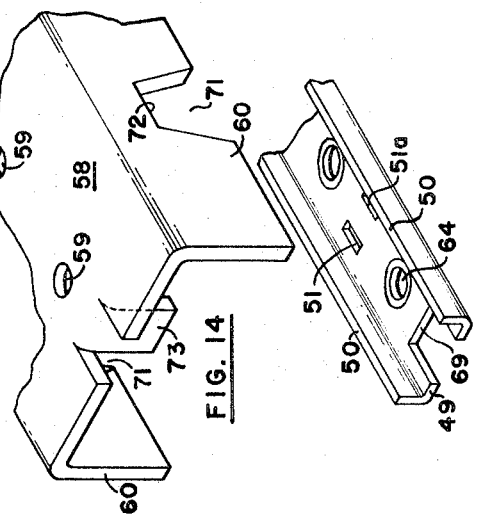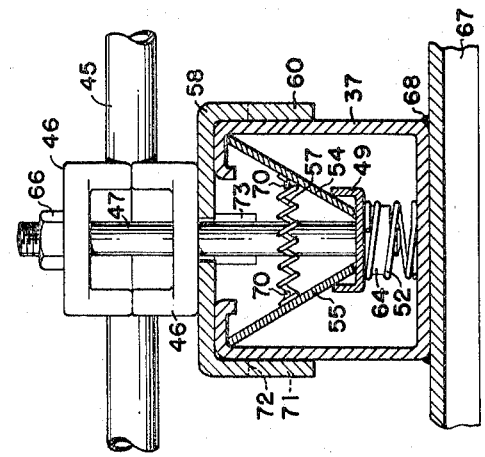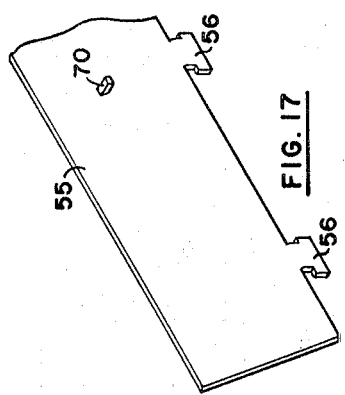

United States Patent Office 3,295,805
Patented Jan. 3, 1967

3,295,805
SUPPORT STRUCTURE AND CONNECTION BETWEEN A STRUCTURE AND A FIXTURE
Donald A. Girard, P.O. Box 172,
Rancho Cordova, Calif. 95670
Filed Mar. 16, 1966, Ser. No. 543,463
24 Claims. (Cl. 248—68)

This is a continuation-in-part of my U.S. application Serial No. 458,998, filed May 26, 1965, now abandoned.

The invention relates to the mounting of fixtures, such as tube clamps or the like, and a structure, such as a plate secured to a supporting element or a metallic channel, e.g., made of thin-walled or sheet metal and having a bottom wall, a pair of upwardly extending side walls and inwardly directed flanges at the tops of the latter, said channels usually having down-turned flanges at the inner ends of said flanges and being commonly known by the trade name "Unistrut." (Because such channels can be mounted in any position, e.g., vertically or inverted, and the plate can be similarly mounted in any position, the terms "bottom" and "top" are used herein only to denote relative directions, for convenience and with reference to the illustrated embodiments, and do not necessarily denote actual directions.)

It is known to attach fixtures, such as clamps, to such channels by engaging elements, e.g., plates or nuts, that abut the undersides of the inwardly directed flanges (or their down-turned flanges) and situated within the channel. Such known assemblies have the drawback that application of excessive force on the bolts that extend therefrom through the opening between the spaces channel flanges causes deformation of the channel flanges and/or causes spreading of the channel side walls.

Further, it is often desirable to provide securing studs, such as bolts, that are spaced along the length of such a channel at uniform or non-uniformed but predetermined distances, e.g., to attach onto the top of the channel a plurality of tube clamps of any suitable type, such as those described in my U.S. Patent No. 3,180,598, issued April 27, 1965, and to locate the group of bolts at any desired place along the length of the channel but firmly anchored thereto. In such a connection it is often desirable to afford the possibility of inserting a composite base, to which the group of studs is fixed, into the channel downwardly through the opening between the channel flanges, because insertion of the base from an end of the channel is often impossible after it has been structurally mounted to a support or wall.

Also, such channels are, in some installations, embedded in concrete or are otherwise juxtaposed laterally to other structures so as to leave no room for attaching along the outsides of the channel a flange (or flanges) of a cap plate that engages the outer side(s) of the channel. As will appear, the instant invention provides such a cap plate having a pair of flanges for engaging the outer sides of the channel to prevent spreading of the side walls; but when the channel is so mounted as to prevent insertion of the cap plate flanges, these flanges are not needed, because the concrete or other structure prevents spreading of the side walls. To avoid the need to stock cap plates of various constructions, it would be desirable to provide a cap plate that can be mounted, as desired, with its flanges directed downwardly to engage the channel side walls, or upwardly. However, when the flanges are directed upwardly, away from the channel, and have depths sufficient to be effecting when mounted downwardly, they often prevent the mounting of elongated elements such as tubes clamped to or by the fixture and extending transversely to the channel member.

Finally, for the purpose of further reducing the types or shapes of mounting parts of the connection necessary to attach the fixtures to supports of various constructions, it is desirable to fashion a plate that can serve both as a cap plate for use in conjunction with a channel as described above (and having side-engaging flanges) and that can be connected to a support directly, as by welding or bolting, without recourse to the said channel member. Such a plate, having no studs of its own for securing the fixture, must be provided with means for attaching such studs, and it is economical—again from the point of view of reducing the necessary variety of parts of various shapes to be stocked—to utilize the same base or stud-securing part as previously described also for use with the plate, without the channel member.

Now according to the invention, a fixture, such as tube-clamping blocks, is attached to a support, whether or not through a "Unistrut" channel member fixed to the support, by a plate, sometimes called a "cap plate," that is directly secured to the support or engages the top of the channel member and is fastened to the support via the said member, against which plate the fixture abuts, and an elongated base that is either in abutment with the said plate or is situated within said channel member and secured thereto, said base carrying fixed thereto at longitudinal intervals a series of spaced studs that extend upwardly from the base through openings, such as holes formed in the plate or gaps between terminally adjacent and separate plate sections, the studs having secured thereto hold-down means, such as nuts or fasteners, that apply a downward force on the fixture to force it against the plate and exert tension on the studs.

When the plate is used without the channel member, it is directly fastened to a support, as by welding or bolting. In this assembly the base is in abutment with the underside of the plate.

When the plate is used in conjunction with a channel member, it is preferably mounted on the top thereof with its marginal flanges directed downwardly and in engagement with the channel side walls to prevent spreading thereof. When, for any reason, there is no room for such a mounting, the plate is inverted, i.e., its flanges are directed upwardly, away from the channel member. To accommodate elongated objects such as tubes that are clamped to the fixture, the flanges have notches spaced longitudinally in correspondence to the spacings of said objects, preferably not so deep as to extend through the full depths of the flanges, the notches in the said flanges being in alignment.

In either embodiment which uses the channel member, the plate is secured to the channel member by thrust plates that are preferably inclined in diverging relation upwardly (away from the base) and abut the base at their lower portions and the undersides of different inwardly extending channel flanges at their upper portions; the studs on the base and the hold-down means acting through the fixture then act to force the plate against the channel member. The studs are thereby placed into tension and the thrust plates are placed into compression.

The cap plate is preferably a single, longitudinally elongated plate that is substantially as long as the base, but this relationship is not essential. The invention can be practiced with a longitudinal series of contiguous or longitudinally spaced plate sections or segments, each having lateral flanges adapted to engage the channel side walls (or only some having such flanges). Such individual plate sections may each have one or more holes for the passage of the stud(s); however, it is also possible to use imperforate plate segments and to extend the studs upwardly through gaps or openings between the segments.

Usually, the said studs extend through openings in the fixture to be attached, such as circularly closed or laterally open bolt holes, and the fixture bears downwards against the cap plate; also usually, the hold-down means are nuts threaddedly secured to the upper ends of the studs. Thereby the studs need not be otherwise secured to the cap plate, although the invention is not limited to this arrangement.

In a preferred although optional construction the base has one or more apertures which receive positioning lips that project downwardly from the lower edges of the thrust plates. According to another preferred although optional feature, the base is a plate having one and, preferably, two marginal stiffening flanges extending longitudinally thereof to prevent or minimize deformation of the plate when tension is applied to the studs. When the base is applied to the cap plate in direct abutment, without the channel member and without use of the thrust plates, the said flanges may be in abutment with the cap plate. The width of the base is advantageously small enough to permit insertion thereof through the gap between the channel flanges, if necessary by canting the base.

Also optionally, resilient means, such as expansion springs, e.g., one or more coiled or leaf springs, are provided beneath the base to facilitate mounting the base and thrust plates within the channel. These expansion means are of special utility when the channel is in a position other than horizontal with the said opening between its flanges at the top. The resilient means may include a spring acting between the base and the bottom channel wall, and/or additional springs connected to the thrust plates in a manner to urge the upper parts thereof apart, toward the channel side walls. Usually more than one of the former resilient means are provided at points spaced longitudinally along the base and fastened thereto; and usually only one of the latter resilient means is provided for each pair of thrust plates. The latter may be coiled springs secured to the thrust plates in openings formed therein but are advantageously springs attached to projections formed in rigid relation to the plates. It is evident that the latter resilient means need not be expansion springs but may take other forms, e.g., contraction means acting on the positioning lips beneath the base.

The connector parts comprising the base with its studs and the thrust plates are inserted into the channel member through the gap between its flanges, and the cap plate is emplaced over the channel member, with the studs projecting upwards through the gap between the channel flanges and, thence, through the openings or holes in the cap plate or between said spaced plate segments or sections. When the sides of the channel member are exposed, the plate flanges are directed downwardly and positioned to engage the outer sides of the channel member; when these sides are otherwise engaged, the cap plate is inverted and the flanges extend upwardly. The fixture is placed on the plate, with the studs extending through its openings, and the hold-down means are tightened (usually after positioning the tubes or other objects within the fixture so that tightening results in a clamping of the tubes or the like), acting on the fixture(s) which is (are) thereby pressed against the plate.

When no fixture is provided at any particular point along the cap plate, the hold-down means may act directly against the plate.

By the above-described tightening of the hold-down means the studs are placed in tension and the base is positioned rigidly within the channel member in spaced relation to the latter, and the cap plate exerts a downward force on the channel member while engaging the channel side walls (when it is positioned with its flanges directed downwardly) to prevent spreading thereof. The latter action opposes deformation, such as that caused by the forces of the upper edges of the thrust plates against the channel side walls.

These thrust plates not only tend to spread the side walls apart but also push upwardly against the inwardly extending channel flanges. The latter action is opposed by the cap plate, regardless of how the flanges thereof are directed. To perform its function properly in either position, it is advantageous to provide a cap plate that is stiff, especially in its longitudinal direction, and the stiffening flanges contribute significantly to this stiffness. Therefore the said notches preferably do not extend through the full depths of the flanges. Usually, it is also desirable to form the plate of metal thicker than the sheet metal of which the channel member is made.

When the base is placed in direct or close relation to the plate, i.e., when the channel member is not used and the plate is fastened directly to the support, means coacting between the plate and base for effecting relative positioning are provided. In an embodiment forming a feature of the invention, the plate has at least one tongue, e.g., a pair of tongues situated at the ends of the plate, and the base has one or two notches formed at one or both ends thereof for receiving said tongue(s). Thereby the plate is positioned relatively to the base both longitudinally and laterally.

The invention will be further described with reference to the accompanying drawings forming a part of this specification and showing several embodiments, wherein:

FIGURE 4 is a perspective view of one thrust plate;

FIGURE 5 is a perspective view of the base and the studs fixed thereto;

FIGURE 6 is a perspective view of the cap plate;

FIGURE 7 is a transverse section through the base showing the attachment of the studs;

FIGURE 8 is a transverse section, similar to FIGURE 7, showing a modified construction for securing the studs to the base;

FIGURE 9 is an isometric view of another modification, showing a segmented cap plate with holes;

FIGURE 10 is an isometric view of still another modification, showing spaced, imperforate cap plate segments;

FIGURES 11, 12 and 13 are transverse sectional views through three alternative connections using parts constructed according to still another modification, further shown in FIGURES 14–17;

FIGURE 14 is a fragmentary isometric view of the cap plate used in FIGURES 11, 12 and 13, showing one end thereof;

FIGURE 15 is a fragmentary isometric view of the base used in these connections, showing one end thereof;

FIGURE 16 is a transverse sectional view of the base, showing a pressed, threaded ferrule; and FIGURE 17 is a perspective view of the thrust plate of the last embodiments.

Figure 1:
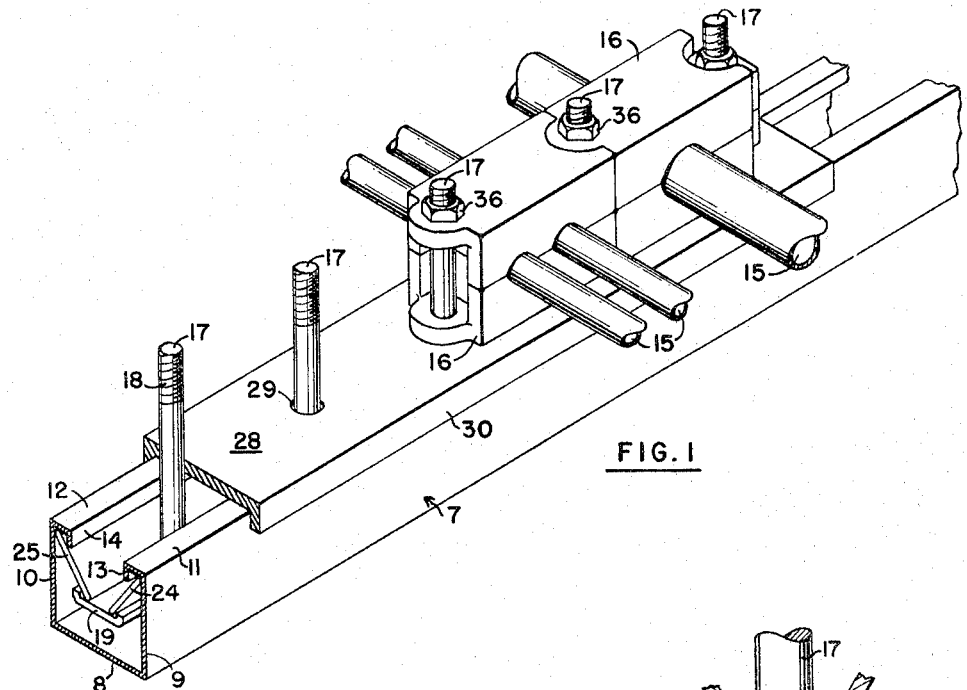
FIGURE 1 is an isometric view of the connection using a channel member, parts being broken away for clarity.
Figure 3:
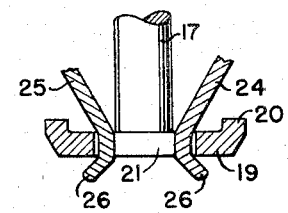
FIGURE 3 is a fragmentary transverse sectional view of the base and the lower parts of the thrust plates, taken on a section plane displaced from that of FIGURE 2.
Figure 2:
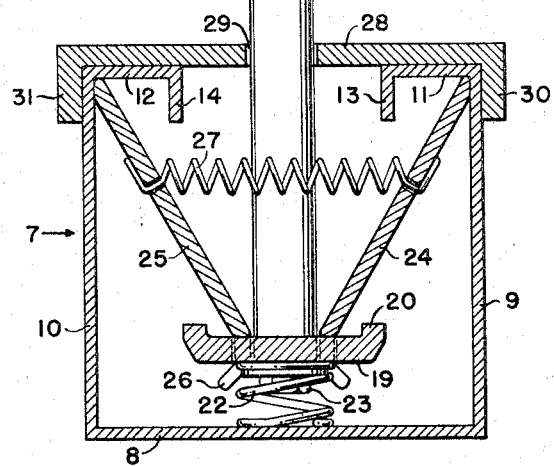
FIGURE 2 is an enlarged transverse section of the connection according to FIGURE 1.

Referring to FIGURES 1–7, 7 represents a structural channel, such as a channel known commercially by the trade-name "Unistrut," e.g., made of sheet metal and having a bottom wall 8, side walls 9 and 10, and flanges 11 and 12 which extend inwardly from the tops of the side walls and terminate in down-turned flanges 13 and 14. The channel may be mounted in any known or suitable manner to a structural support (not shown) and may be of any length. In the specific embodiment shown the channel is used to support a plurality of tubes or pipes 15 that extend transversely to the channel and are clamped by a fixture consisting of metallic blocks 16 which are of identical outlines (save for the number and/ or the sizes of the tube-receiving recesses formed in their abutting faces.) These blocks may be constructed in accordance with my aforesaid U.S. patent, to which reference is made for details. These blocks also may be constructed as described in my U.S. Patent No. 3,216,683, issued November 9, 1965. Such blocks are representative of fixtures that may be attached to the channel according to certain embodiments of the invention or to a support structure according to another embodiment, and require studs 17 which extend upwardly from the channel member at suitable, e.g., uniform intervals along the length of the latter.

According to this embodiment of the invention, the studs 17, which may have threads 18 at their upper ends, are fixed to an elongated base 19 at uniform or predetermined longitudinal intervals. The base is preferably stiffened against longitudinal deformation, e.g., by upturned flanges 20 at its margins. Also preferably, the base has one or more apertures 21 formed therein, e.g., near to or on its center line. To facilitate preliminary mounting of the base within the channel member, useful especially when the channel is mounted in a position other than that shown (e.g., inverted or with its longitudinal axis vertical), the base is provided with one or several longitudinally spaced, resilient expansion elements, such as an expansion spring 22 secured to the base beneath it by screw 23, whereby the spring acts between the bottom wall 8 and the base 19. The spring 23 is optional.

The base is secured within the channel in spaced relation to the channel member by a pair of thrust plates 24, 25, that are longitudinally elongated and, in the preferred construction, as long as the base. These thrust plates have longitudinal upper edges that engage the undersides of the channel flanges 11, 12 at the upper, outer corners of the channel, and longitudinal lower edges that engage the upper face of the base on opposite sides of the studs 17, one on each side of the studs. In the embodiment shown, in which at least one aperture 21 is formed in the base 19, each thrust plate has an integral, dependent positioning lip 26 that is curved outwardly (toward the adjacent channel side wall) and positioned to enter the aperture 21. In other words, the thrust plates are mirror images; however, they may be identical when an even number is used on each plate and/or when the aperture 21 is at the center of the base, between its ends, as well as when a plurality of apertures 21 is provided. Optionally, but preferably, the thrust plates are provided with resilient means urging the upper parts thereof outwardly. Such means may be embodied as one or more longitudinally spaced expansion springs 27 having their ends secured to the plates, e.g., by extending through holes formed therein, as shown.

A cap plate 28 is mounted on the top of the channel member, lying flatly against the flanges 11, 12, and having lateral, down-turned flanges 30, 31, that extend longitudinally and engage the outer sides of the channel side walls 9 and 10 at their upper parts, near the said flanges 11, 12. The cap plate may be a single piece of length about equal to that of the base and then has holes 29 situated at spaced longitudinal intervals in alignment with the studs 17, which extend therethrough with freedom. The cap plate is preferably stronger than, e.g., is formed of thicker metal than that used to form the channel, so as to provide rigidity and strength to the channel.

The studs 17 are secured to the base in any suitable manner, as by pressing the studs into holes formed in the base. If desired, they may be further secured by tack welding, using weldments shown at 32 in FIGURE 7.

According to a modified construction shown in FIGURE 8, the studs 17a are threaded also at their lower ends 33. They are attached to the base 19a by internally threaded elements such as nuts 34 which are welded to the base 19a by weldments 35. In this embodiment the studs 17a may be attached to the base 19a either prior to or after the base is inserted into the channel. As previously noted, the flanges on the base may be turned downward as shown at 20a.

The cap plate may include a plurality of plate segments mounted along the channel. In one such embodiment, shown in FIGURE 9, there are contiguous cap plates 28a, 28b, each having holes 29 and lateral flanges 30, 31, as previously described. They are used as was described for the plate 28 but may be applied sequentially, after attaching the fixture to some of the plates.

According to another variant, the cap plate segments are spaced apart, as illustrated in FIGURE 10. Here the cap plate segments 28c, 28d and 28e are spaced longitudinally and are slightly shorter than the intervals between the studs 17, so that the studs extend between the segments; no holes are required. Again, each cap plate segment has flanges 30, 31, for engaging the channel side walls and lie flatly on the channel flanges 11, 12.

In attaching the fixture, such as the blocks 16, the base 19 or 19a is first inserted into the channel 7 between the flanges 11, 12, passing through the gap defined by the flanges 13, 14. The thrust plates 24 and 25 may be thereafter inserted, or may be attached to the base by their lips 26 before insertion of the base. The expansion springs 22 and 27, when provided, retain these parts in approximately their final positions and facilitate the subsequent operations. The cap plate 28 (or the plates 28a, 28b, or 28c, 28d, 28e) is then placed onto the channel 7 as illustrated with the studs 17 or 17a extending above the cap plate(s); the fixture is then secured to the studs. For example, any number of blocks 16, corresponding in number to one less than the number of studs, can be placed in engagement with the cap plate(s), and a second tier of like but inverted blocks is placed on top after emplacing the tubes 15, which extend through the approximately circular holes formed by the mating, transverse tube-receiving recesses in the blocks. The base 19 of 19a, together with the thrust plates, studs and blocks, can be shifted longitudinally relatively to the channel to conform the assembly to the course of the tubes. Thereafter hold-down means, such as the nuts 36, are screwed down onto the studs 17 or 17a to engage the blocks and force them firmly against the cap plate 28 (or the variants 28a–28e), thereby clamping the tubes and placing the studs 17 or 17a in tension. This urges the base 19 or 19a upwards and places the thrust plates 24, 25 in compression between the flanges 11, 12, and the base 19 or 19a. The cap plate flanges 30, 31, prevent spreading of the channel side walls 9, 10, while the flat lower face of the cap plate or plate segments bears against the upper surfaces of the channel flanges 11, 12, to prevent upward deformation such as might be caused by the thrust plates.

It is evident that the thrust plates 24, 25, are restrained against motion in all directions relatively to the channel member, longitudinal restraint being by friction and effective only after tightening of the nuts 36. When the lips 26 are provided additional longitudinal restraint is provided between the base and the thrust plates.

Referring to FIGURES 11 and 14–17, parts corresponding to those previously described are identified by corresponding reference numbers, increased by 30. The channel member 37 is constructed as previously described, and may be secured to a stationary support 67 by any means, such as weldments 68 or by bolting. The base 49, having upstanding lateral flanges 50, is formed with a plurality, such as three, pairs of apertures 51, 51a, positioned on opposite sides of the longitudinal center line of the base. Each end of the base is formed with a recess or notch 69. For attaching the studs 47, the base is formed with a series of holes, situated on its center line, into which internally threaded ferrules 64 are pressed for frictional retention. As shown, each ferrule has a shoulder engaging the under side of the base. A plurality of expansion springs 52 is secured beneath the base, e.g., by frictional engagement about selected ferrules 64.

Each thrust plate 54, 55, is formed with a plurality, such as three, dependent positioning lips 56 that are integral thereto (or otherwise attached), spaced apart to enter the apertures 51 or 51a. As shown, each lip has lateral notches of heights to receive parts of the base 49 when shifted longitudinally relatively to the thrust plates, thereby insuring vertical security; further, these lips are curved as previously described. Further, each thrust plate carries a projecting pin 70 shaped to enter and retain in position an end of an expansion spring 57, the pin being attached by welding or formed integrally with the plate by being bent out after the plate is incised. In this embodiment the two thrust plates may be identical.

The cap plate has dependent, lateral flanges 60, spaced to engage the sides of the channel member 37. To permit the assembly to be described for FIGURE 12, these flanges are deep. The cap plate is formed with a series of holes 59 situated on its center line and spaced in accordance with the ferrules 64 for receiving the studs 47, which project upwardly beyond the cap plate and are threadedly secured to the ferrules. The flanges 60 have recesses or notches 71 formed at least at the longitudinal intervals between the holes 59 to accommodate the tubes in the assembly to be described for FIGURE 13. It is obvious that these notches may have other lengths, e.g., extend through several times the distance between the holes 59, so that each can accommodate several tubes. The depths of these notches to their bases 72 is advantageously less than the total depth of the flange, to provide stiffness to the cap plate and to engage the channel member along the full length of the plate. Each end of the cap plate has a positioning tongue 73, e.g., formed integrally by incising the plate ends and bending the tongue downwards. Each tongue 73 has a width to fit into an aperture, such as the notch 69, in the base, and the tongues 73 are spaced to position the cap plate against relative longitudinal motion on the base. The parts 69 and 73 coact only in the assembly of FIGURE 12.

In assembling the parts to make the connection of FIGURE 11, the base 49 and its springs 52, together with the thrust plates 54, 55 and their expansion spring 57 (and the studs 47 if previously attached) are inserted into the channel member from the top. The springs 52 urge the base upwards and the spring 57 moves the thrust plates apart, so that the base and thrust plates assume the positions shown in this view. The studs 47, if not previously attached, are screwed into the ferrules 64. The cap plate 58 is next applied. A fixture or a series of fixtures, such as the tube-clamping blocks 46, and the tubes 45 are placed onto the cap plate with the studs 47 extending through openings in the fixture(s), and nuts 66 are applied to the studs to clamp the tubes and press the fixture(s) against the cap plate. This applies tension to the studs and places the thrust plates into compression.

Referring to FIGURE 12, there is shown an assembly which does not employ a channel member. In this embodiment the cap plate 58 is attached directly to the support 67, as by welding. Prior to or after welding the cap plate, the base 49 is positioned beneath the cap plate, between its flanges 60. The studs 47, if not previously attached, are screwed into the ferrules 64 and the parts 45, 46 and 66 are attached as previously described; the springs 52 may be used or omitted. When the studs 47 are placed into tension the base 49 is pressed against the cap plate at its flanges 50 and the tongue 73 at each end of the cap plate is received within a corresponding notch 69 in the base to position the base both laterally and longitudinally with the ferrules 64 in alignment with the holes 59. It will be noted that the flanges 60 are deep enough to permit the base 49 to be situated beneath the top of the cap plate with clearance, e.g., to permit the base to be slid in from the end without engaging the tongues 73. The springs 52, when provided, bear against the support 67 to bring the tongues and notches 69 into cooperation even before tension is applied to the studs.

Referring to FIGURE 13, the channel member 37 is shown to be encased in concrete 75, making it impossible for the cap plate flanges 60 to engage the sides of that member. In this arrangement the concrete supports these sides and the flanges 60 are not needed to prevent spreading. Hence the cap plate is mounted on the channel member in inverted position. The tubes 45 clamped by the fixtures 46 extend through the notches 71 in the upstanding flanges 60, and the bases 72 of these notches are clear of the tubes. The parts are otherwise assembled as was described for FIGURE 11.

It is evident that parts of identical construction can be employed for making the various connections shown in FIGURES 11, 12 and 13, save that the thrust plates 54, 55, and their spring 57 are not used in FIGURE 12, the spring 52 being optional in this case.

I claim as my invention:

1. A support structure suitable for connecting a fixture to a "Unistrut" channel member that includes a bottom wall, side walls, and flanges extending inwardly from the tops of said side walls, leaving a longitudinal opening between said flanges, which structure comprises:
   (a) an elongated base shaped to be situated within a channel member in spaced and parallel relation thereto, said base having fixed thereto at longitudinal intervals a plurality of studs which have lengths to extend outwardly beyond the channel member between its flanges,
   (b) a pair of thrust plates adapted to be situated one on each side of said studs with at least parts of the parts thereof in abutment with the said base and the upper edges shaped for abutment with the undersides of such channel flanges,
   (c) at least one cap plate adapted to be positioned on the top of such channel member in abutting relation thereto and having a plurality of openings formed therein through which said studs can extend, and
   (d) means acting on said studs and adapted to act on said fixture for applying tension to the studs while applying downward force against said cap plate through the said fixture, whereby said thrust plates can be placed in compression between said base and channel flanges.

2. A support structure as defined in claim 1 wherein said cap plate has at least one stiffening flange integral thereto and extending longitudinally along a margin thereof.

3. A support structure as defined in claim 2 wherein said flange of the cap plate has a plurality of notches formed in the edge thereof at longitudinally spaced locations for receiving tubes that extend transversely to the length of said cap plate and are secured by said fixture.

4. A support structure as defined in claim 1 wherein said cap plate has a pair of stiffening flanges formed integrally therewith and extending longitudinally along the margins thereof, said flanges being spaced apart by a distance substantially equal to the width of such channel member for engaging the outer sides of a channel member.

5. A support structure as defined in claim 1 wherein said cap plate is a single, continuous plate of length substantially equal to that of the said base, and said openings are holes extending through said cap plate at longitudinal intervals corresponding to the intervals between the studs.

6. A support structure as defined in claim 1 wherein said base has at least one aperture and each of said thrust plates has at least one positioning lip extending downwardly from the lower edge thereof for entry into a said aperture in the base.

7. A support structure as defined in claim 6 wherein each of said lips is curved toward a side of said thrust plate, so as to extend toward the nearer side of a channel side wall when inserted into an aperture in the base.

8. A support structure as defined in claim 1 wherein said base has longitudinal stiffening flanges formed integrally therewith at the margins thereof.

9. In combination with the support structure defined in claim 1, resilient means acting on said thrust plates for urging the upper parts thereof outwardly against the side walls of a channel.

10. A support structure as defined in claim 1 wherein each of said thrust plates has formed, at a level between the top and bottom portions thereof, a projection, each of said projections being positioned to extend toward each other when the thrust plates are engaged to the base, and resilient expansion means engaged to the projections of both plates for urging said thrust plates outwardly against the side walls of a channel.

11. In combination with the support structure defined in claim 1, resilient expansion means beneath said base adapted to act on the bottom wall of a channel member for urging the base upwardly from said bottom wall.

12. A connection between a fixture and a structural channel which comprises:
 (a) a metallic structural channel member having a bottom wall, upwardly extending side walls, and inwardly extending flanges at the upper ends of the latter leaving a longitudinal opening between said flanges,
 (b) an elongated base situated within said channel member in spaced and parallel relation thereto, said base having fixed thereto at longitudinal intervals a plurality of studs which extend out from the channel through the said opening,
 (c) a pair of longitudinally elongated thrust plates situated one on each side of said studs with at least parts of the lower plate edges in abutment with the top of the base and disposed in upwardly diverging relation with an upper part of each thrust plate in abutment with the underside of one of said channel flanges,
 (d) longitudinally elongated cap plate means on the top of said channel member having openings through which said studs extend,
 (e) at least one fixture having longitudinally spaced openings for receiving said studs mounted on the upper face of said cap plate means, said studs extending through said last-mentioned openings, and
 (f) hold-down means engaged to said studs for engaging said fixture and forcing the fixture against the cap plate while applying upward thrust to said studs and placing them in tension, thereby placing said thrust plates in compression between the base and the said channel flanges.

13. A connection as defined in claim 12 wherein said studs are fixed to said base in a manner preventing separation during installation, and the said base has a width to permit insertion of the base with said studs into the channel member through the said opening thereof.

14. A connection as defined in claim 12 wherein said studs are threaded at their lower ends and said base includes internally threaded means for connecting said studs to the base, said studs being threadedly secured to the base by the said threaded means.

15. A connection as defined in claim 12 wherein said cap plate means includes a plate and a pair of downwardly extending stiffening flanges situated one at each side of the plate and in engagement with the outer sides of the channel side walls.

16. A connection as defined in claim 12 wherein said cap plate means includes a plate and a pair of upwardly extending stiffening flanges situated one at each side of the plate, each of said flanges having longitudinally spaced notches for receiving elongated tube-like members secured to said fixture and extending transversely to the cap plate, the notches in the said flanges being in alignment.

17. In combination with the connection defined in claim 12, resilient expansion means situated between said base and said bottom wall of the channel member for urging said base upwardly.

18. A connection as defined in claim 12 wherein said fixture is a tube-clamping assembly comprising at least one pair of inner and outer clamping blocks having longitudinally spaced stud-receiving openings through which said studs extend and constituting the said openings thereof, said blocks having transverse, opposed, recesses for receiving respectively parts of a tube clamped thereby, one block of each pair being mounted on the outer face of said cap plate means and the other being engaged by the said hold-down means.

19. The connection defined in claim 12 wherein said base has a plurality of longitudinally spaced apertures formed therein and each of said thrust plates has a plurality of positioning lips that extend downwardly from the lower part thereof and are positioned within apertures of the base.

20. In combination with the connection defined in claim 12, resilient means acting on said thrust plates for urging the upper parts thereof outwardly against the channel side walls.

21. A connection between a plate and a fixture, which comprises:
 (a) a longitudinally elongated plate formed with openings for the passage of studs at longitudinally spaced locations,
 (b) a longitudinally elongated base engaged to the underside of said plate having fixed thereto at longitudinal intervals a plurality of studs which extend through said openings in the plate and beyond the plate,
 (c) at least one fixture having longitudinally spaced openings for receiving said studs mounted on the upper side of said plate, and
 (d) hold-down means engaged to said studs and engaging said fixture for forcing the fixture against the plate while applying upward thrust to said studs and placing them in tension.

22. A connection as defined in claim 21 wherein said elongated plate and base each has at least one stiffening flange formed integrally therewith and extending longitudinally along the plate and base, respectively.

23. A connection as defined in claim 21 wherein said elongated plate has at least one tongue extending therefrom and directed toward said base, said tongue being engaged to said base for positioning the base relatively to the plate.

24. A connection as defined in claim 23 wherein the plate has a pair of tongues situated respectively near the ends of the plate, said tongues having widths less than that of the base, said base has notches formed in the ends thereof, and said tongues are received within said notches.

No references cited.

CLAUDE A. LE ROY, *Primary Examiner.*